Jan. 17, 1961 T. G. LEWIS 2,968,134
MANUFACTURE OF PRECISION CONES
Filed Oct. 9, 1959 2 Sheets-Sheet 1
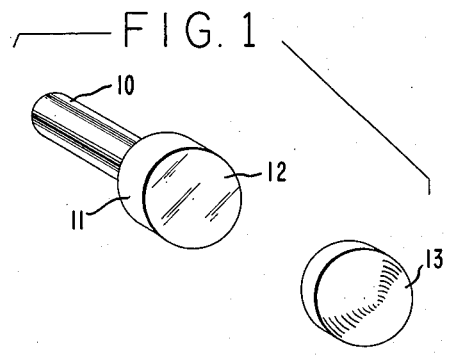
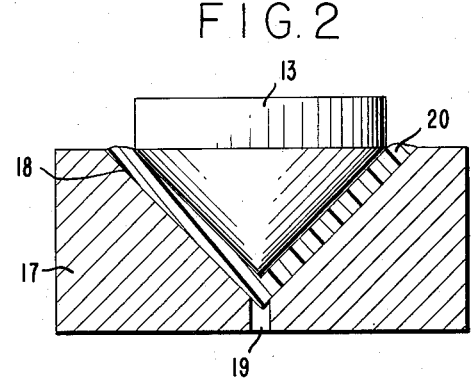
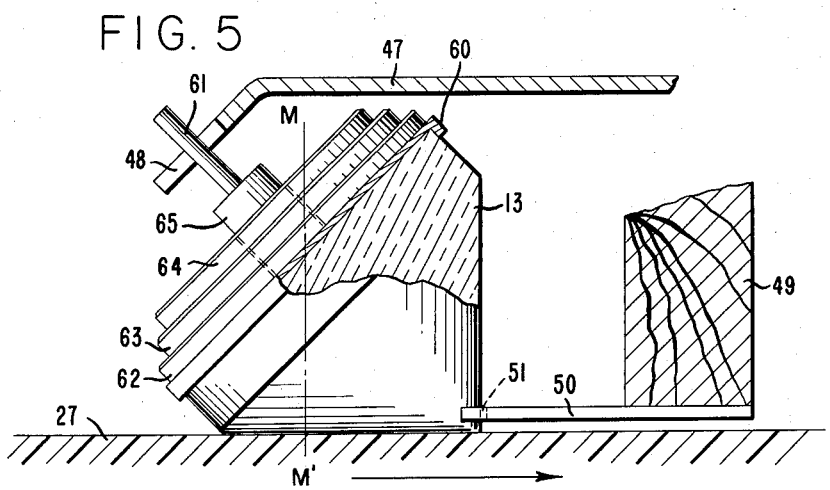
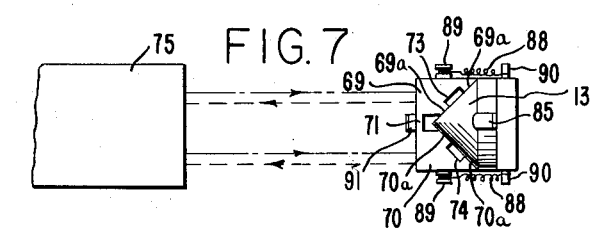
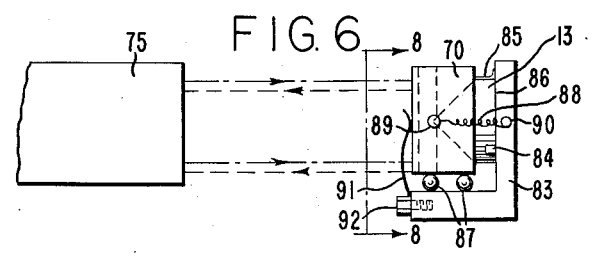
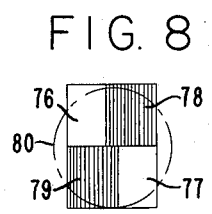
INVENTOR
THOMAS G. LEWIS
BY Harry J. McCauley
ATTORNEY Jan. 17, 1961  T. G. LEWIS  2,968,134
MANUFACTURE OF PRECISION CONES
Filed Oct. 9, 1959  2 Sheets-Sheet 2

INVENTOR
THOMAS G. LEWIS

BY  Harry J. McCauley

ATTORNEY

United States Patent Office 2,968,134
Patented Jan. 17, 1961

2,968,134
MANUFACTURE OF PRECISION CONES
Thomas G. Lewis, Wilmington, Del., assignor to E. I. du Pont de Nemours and Company, Wilmington, Del., a corporation of Delaware
Filed Oct. 9, 1959, Ser. No. 845,493
9 Claims. (Cl. 51—124)

This invention relates to a method and apparatus for the manufacture of near-perfect circular cones, and particularly for the preparation of circular optical cones which are useful in bore interferometry, such as described in my copending application Ser. No. 845,494, filed this same date, and for other purposes.

The accuracy standards for circular optical cones (hereinafter referred to in interests of brevity merely as "cones") of the type useful in bore interferometry are very rigorous, preferably involving the forming of refractory materials, such as fused quartz or the like, to an included angle within ±2 seconds of arc, perfection in circularity to ± one microinch measured radially, and the development of straightness measured along an element of the cone within ±1 microinch. In addition, the optical requirements for undistorted reflectivity require that the surface finish be about 0.25 microinch R.M.S., or better. These are very exacting requirements indeed and it has hitherto not been possible to meet them, even approximately, by the use of techniques known to the art.

A primary object of this invention is to provide a method and apparatus for the manufacture of near-perfect circular cones, particularly optical cones. Other objects of this invention are the provision of techniques and equipment for the purposes described which are economical in first cost, relatively fast in operation, and which can be practiced by persons who are not particularly expert in optical finishing procedures.

Figure 4:
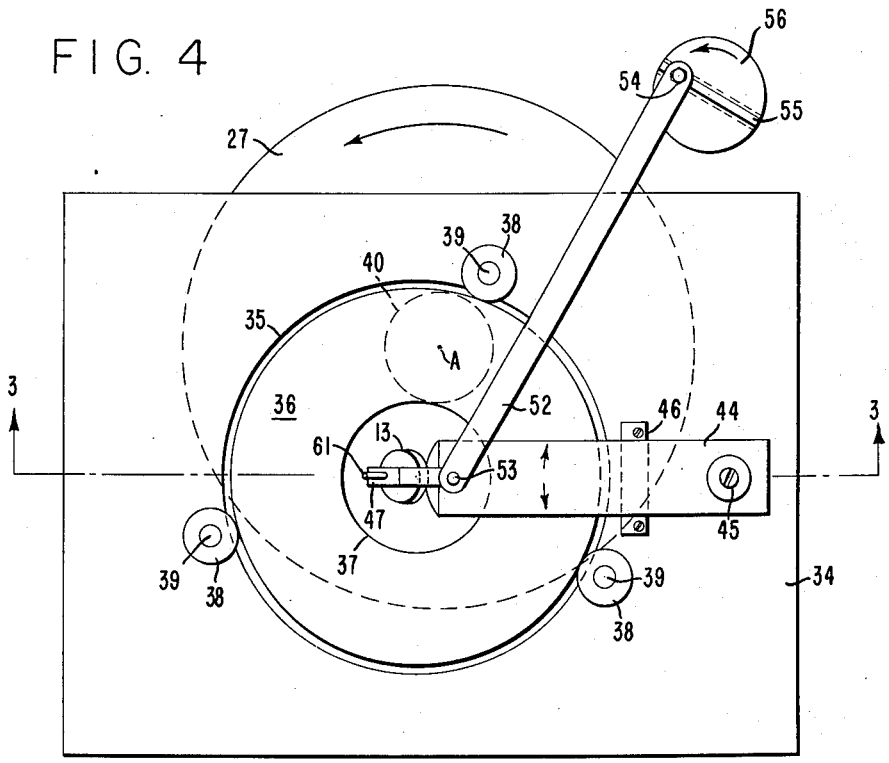
Figure 3:
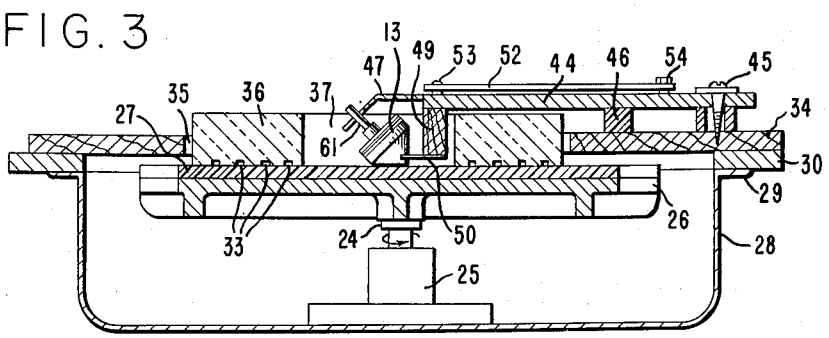

The manner in which these and other objects of this invention are accomplished will become apparent from the following detailed description and the drawings, in which:

Fig. 1 is an exploded view of a grinding fixture and a near 90° included angle quartz cone in the first step of formation according to this invention, Fig. 2 is a cross-sectional view of a full contact lap according to this invention which is adapted to bring an optical cone into truly round configuration, Fig. 3 is a cross-sectional view taken on line 3—3 of Fig. 4 of a preferred embodiment of a line contact lapping apparatus which is adapted to bring the included angle of an optical cone to very precise tolerances, Fig. 4 is a full plan view of the apparatus of Fig. 3, Fig. 5 is a detailed side view showing an optical cone mounted in lapping position in the apparatus of Figs. 3 and 4, part of the cone being cut away to show the details of mounting of the rear guide, Fig. 6 is a side elevation of one type of angular checking fixture adapted to the precise measurement of the included angle of an optical cone shown in measuring relationship with respect to an auto-collimator for accomplishment of the measurement, Fig. 7 is a plan view of the apparatus of Fig. 6, and Fig. 8 is a front view of the fixture taken on line 8—8 of Fig. 6.

Generally, the manufacture of cones according to this invention comprises first grinding the cones to general conical shape and thereafter concurrently finishing them to precise dimensional tolerances as well as to a high optical finish, where optical service is contemplated, by sequentially and repetitively lapping the cones with a full-contact lap and a line-contact lap using fine abrasives and a broken pattern, and apparatus for accomplishing this lapping.

Typically, the fused quartz blank is received as a cylinder about 3" in diameter by 3" long and the following description is directed to the production of an ultra-precision cone having an included angle of 89°59'44"±2" with a base diameter of 2.730". Such a cone is adapted to display from five to seven sharply defined light interference fringes spaced ⅛" or more apart for ease in visual observation per inch of length measured from the apex of the cone normal to the central axis when the cone is employed as the reflective element in bore interferometry with a mercury-vapor light source, all as described in detail in my co-pending patent application Ser. No. 845,494, hereinbefore referred to. It will be understood that the cones may have either an acute or an obtuse included angle, the light interference fringes being merely reversed in orientation for one condition as compared with the other, but that the variance from 90° reference must be as precisely obtained as possible at about 2 seconds of arc of included angle for each individual interference fringe. The first step is the conventional optical milling of the blank with a diamond tool to approximate shape, leaving about 0.010" of material for subsequent finishing operations, except that the 2.730" diameter base is milled to final size. The base of the cone is then semi-finished by conventional manual lapping techniques with a series of emery abrasives graduated from rough through fine on a cast-iron lap. Finally, the base is polished with a pitch lap to an optical flat. To insure the precise mounting of the cone for the later operations hereinafter described, the accuracy of flatness of the base should be about 2 microinches or better.

The next operation in sequence is grinding. To accomplish this, the cone is mounted by optical contact to its base on a fixture of the design shown in Fig. 1. This fixture is fabricated from tool steel hardened to Rockwell C 60 or harder and is provided with a shank 10 which is adapted to be chucked in a true-running grinding spindle, such as the spindle normally supplied with a Landis Model 484-38, 14" x 72", Type C universal cylindrical grinder. The enlarged end 11 of the fixture is ground to an outside diameter of 2.730" and is finished to an optically flat surface 12 normal to the axis of rotation of the spindle by conventional lapping techniques using a cast-iron lap and a graduated series of diamond abrasives. It is essential that face 12 of the fixture be as exactly normal to the axis of rotation of the spindle as practicable, and this can be checked with the fixture in place and the spindle in rotation by use of a standard auto-collimator. With the surface truly normal to the spindle axis, an observer will note no displacement of the auto-collimator image. In the particular instance described, the error from normality in this regard was about 2 seconds, which could be tolerated. Precise mounting of the cone in process, 13, with respect to the fixture is important because, if surface 12 and the mating base of cone 13 are not substantially optically flat, attachment by optical contact will be impossible. If other means of attachment are employed there occurs elastic deformation in the cone under the stresses of attachment and grinding, and there is danger that the cone will thereafter assume some out-of-true shape after removal from the fixture, or when applied to a different support. Moreover, the axis of cone element 13 is preferably disposed precisely 90° with respect to its base to obtain the alignment which is essential to uses of the cones as optical elements, and this can be accomplished only by precise invariable mounting of the cone through all stages of its fabrication.

The cone in process 13 is attached to face 12 of the fixture by optical contact, by which is meant the surface-to-surface adherence of substantially flat bodies by the displacement of air in the interspace by an action similar to the wringing of gage blocks. The attachment of the cone to the fixture is very firm; however, to prevent moisture penetration between the abutting surfaces which might disrupt the optical contact it is desirable to paint the adjacent edges of the assembled cone and fixture with several coats of an appropriate sealer, such as the alkyd resin adhesives marketed under the trade name "Glyptal," or similar materials.

After the sealer has dried, the grinding operation is commenced using a conventional oil-in-water emulsion coolant throughout. Grinding is conducted with the work spindle head set to 45° (i.e., one-half of the desired included angle of the cone) using a series of diamond wheels in sequence, those designated in order from the Norton Company's D-150-J-100-B through progressively finer grit sizes D-320-S-N-100-B to the final D-600-S-N-100-B proving completely satisfactory. During grinding the cone is revolved at a speed of about 120 r.p.m. with a table traverse speed of approximately 30"/minute. The in feeds of the grinding wheels were about 0.0002"/pass for the initial wheel, 0.0001"/pass for the intermediate wheel and 0.00005"/pass for the final wheel. During the final grinding operation it is desirable, in the interests of saving lapping time subsequently, that the included angle of the cone be measured and suitable correction be made by adjustment of the spindle setting accordingly. The measurement of included angle is accomplished through the use of an auto-collimator as hereinafter described, following which the spindle head may be shifted very slightly in one direction or the other, so that subsequent fine grinding may be conducted in a manner bringing the included angle toward or away from the 90° reference. In the typical case described it proved possible to obtain by the grinding step an included angle measuring 89°, 59', 44", ±10", with a surface finish of between about 1 and 2 microinches R.M.S. This entailed making 10 or 15 passes with the final grinding wheel after the guiding included angle check was obtained. It will be understood that this is, of necessity, a more or less cut-and-try procedure, due to the fact that temperature conditions with the accompanying thermal stresses change somewhat within the grinding machine while the included angle check is being made and the corrective setting of the spindle must be made without a precalculated exact compensation for this phenomenon. Nevertheless, care in taking these corrective steps is well-justified since there is appreciable saving of subsequent lapping time if near-conformity to the 90° reference included cone angle can be obtained during the grinding procedure.

The next steps in order are the lapping operations, which are conducted sequentially by full-contact lapping followed by line-contact lapping, and then repeating, until included angle and surface finish measurements reveal that the cone is brought to final precise dimensions and final high quality optical finish.

The full-contact lap is shown in cross-section in Fig. 2. This lap may conveniently comprise an aluminum or cast-iron cylindrical pitch support 17, about 3.75" in outside diameter and 2.5" long, which is provided centrally with a 90° included angle conical crater 18 of a depth sufficient to receive the full length of the cone processed plus a space for about ¼" thickness of optical pitch 20 over the entire surface of the crater. The base of support 17 is provided with a drilled passage 19 about 3/16" diameter concentric with the apex of crater 18 to permit flow of the pitch in a downward direction during the lapping under the pressure of the lapping operation.

It is preferred to employ an optical pitch which ranges in temper in the grades of medium hardness to soft. Too hard a temper was found to aggravate the formation of concentric grooves or scratches. In the particular example herein described, "Cycad" pitch was employed in the manufacture of the full-contact lap, this being tempered in accordance with conventional practice by the addition of turpentine to the molten pitch, thereby softening it, or by heating the pitch for an extended time in order to drive off solvents, thereby hardening it and increasing its temper. The optical pitch is conveniently applied to crater 18 in the hot flowing condition with a small wooden paddle about ⅛" thick x 1" wide, the paddle being dipped into the pitch and the pitch then being allowed to run off onto the conical surface. Pitch support 17 may be rotated during the pitch application to even the distribution into a layer 20. As the pitch hardens, the paddle may be employed to trowel the surface of the pitch into approximate conformity with the surface of crater 18. Several applications may be necessary in order to build up the thickness of the pitch to about ¼".

After the pitch has hardened, it is desirable to preliminarily shape layer 20 to conform generally to the surface of the cone 13 in process. This is accomplished by first heating the cone by immersion in boiling water and thereafter inserting it downwardly into the pitch crater with the axis of the cone vertical while applying a total force of about 5 lbs. for a period of time of about 5 minutes. The complete shaping of the pitch may necessitate repeated heatings of cone 13 and reinsertions until, finally, the layer of the pitch is seen to have taken on a surface texture substantially reverse to that of the cone. The objective here is to form the pitch adjacent to the cone which it is desired to be lapped to near conformity therewith, with the elimination of any surface voids and with substantially total contact achieved by the pitch over the full length of the cone section of 13. It is important that the pitch surface opposed to cone 13 be well wetted with water before insertion of the cone to avoid sticking. Pitch layer 20 is preliminarily shaped to accommodate the cone 13 each time the cone is subjected to a full-contact lapping step.

Full-contact lapping is carried out manually by coating the lap face generally with a suspended abrasive such as red rouge in water and then inserting the cone into the lap and oscillating it through angles of about 90° to about 120° in contact with the rouge-covered pitch employing a force applied coparallel to the axis of the cone of about 2 lbs. During the course of lapping the pitch support 17 is slowly turned about its vertical axis in one direction thereby breaking up the lapping pattern. Also, the cone is disengaged momentarily from the crater of pitch 20 about twice every minute during the lapping process to permit redistribution of the abrasive over the pitch surface. Fresh suspended rouge is applied periodically as required, which is signaled by the necessity to use increased force to maintain the lapping motion. As hereinbefore mentioned, the lapping is conducted in two separate processes alternating one with another. At the beginning of the lapping, full-contact and line-contact lapping may require about 30 minutes' time individually, which is reduced progressively as the cone approaches perfection so that, finally, the duration may be only about 5 minutes for each.

Turning now to the line-contact lapping, this is conducted with apparatus such as that shown in Figs. 3, 4 and 5. Referring to Figs. 3 and 4 particularly, a preferred apparatus utilizing a conventional optical polishing wheel is detailed which is provided with a vertically disposed power-driven spindle 24 rotated at a speed of approximately 90 r.p.m. by a motor indicated generally at 25. A cast-iron circular plate 26 is keyed to spindle 24 so as to be thereby rotated in a generally horizontal plane and the optical pitch flowed thereover in a layer 27 approximately ½" thick. The apparatus is surrounded by an enclosing frame 28 which is provided with an upward facing flange 29 around the entire periphery upon which is mounted a frame member 30, which may be of wood or metal as desired. From Fig. 3, it will be noted that the top surface of pitch layer 27 lies slightly above the horizontal plane of flange 29. Surmounting frame 30, and fixedly attached thereto, and thus to flange 29, is a 1" thick rectangular piece of plywood 34, which is provided centrally with a circular hole 35 adapted to receive the lap conditioning ring 36 hereinafter described.

Lap conditioning ring 36 is preferably an annular piece of Pyrex glass about 2" thick and 10" outside diameter which is bored centrally to provide a 4½" hole 37 within which the cone lapping is conducted. The underside of ring 36 is preferably provided with two sets of straight grooves 33 disposed normally one to another about ⅛" wide x ⅛" deep spaced on center-to-center distances of 1", thereby providing a regular grid pattern of squares ⅞" on a side. I have found that these serrations improve the performance of conditioning ring 36 by distributing the rouge abrasive more evenly. As seen in Fig. 3, conditioning ring 36 rests on the top surface of optical pitch layer 27, and is retained in position by three ball bearings 38 mounted on vertical spindles 39 secured to plywood 34 disposed approximately 120° apart around the periphery of hole 35, with the inner peripheries of the bearings extending across the ⅛" clearance between hole 35 and ring 36 to abut the outer periphery of ring 36 and retain it in a preselected position in space, while permitting free rotation of ring 36 about its center by virtue of rolling contact with bearings 38.

As will be seen in Fig. 4, the center of lap conditioning ring 36 is disposed eccentrically to the center of rotation A of circular plate 26, and this eccentricity can be adjusted as hereinafter described by shifting the position of plywood support 34 radially with respect to center A as conditions require. I have found it necessary to remove a quantity of the pitch loading 27 adjacent to the center of rotation A in order to permit freedom of inward radial flow of the optical pitch in the course of lap preconditioning and later use. For the typical apparatus herein described in detail, utilizing a 15" outside diameter pitch lap 27, good results were obtained by removing all of the pitch within a 4" diameter circle measured from A as center, this undercut being indicated at 40, Fig. 4. At the same time the pitch is also free in displacement radially outward because it is not confined peripherally by plate 26.

The swing arm supporting the cone in process is indicated at 44, this being merely a flat wood or metal piece which is pivoted for free rotation about spindle 45 secured to plywood 34. Preferably a rest block 46 fabricated from nylon polymer or a similar material with self-lubricating properties is attached to plywood 34 generally radially toward the center of hole 35 from 45, to support the weight of swing arm 44 and its attachments throughout its full sweep, so that this weight is effectively isolated from the lapping load per se. Arm 44 is provided at its inward end with an extension 47 which is bent downwardly at the outboard end at an angle of about 45° and is slotted at 48 (Fig. 5) to receive the cone guide pin 61 with sufficient clearance to permit free rotation of the guide pin therein, but with close enough clearance so that the guide pin is constrained to move arcuately with rotation of the swing arm about spindle 45 as center. An additional guide for the optical cone consists of block 49 (Figs. 3 and 5) fixedly attached to the underside of swing arm 44 at a point overlying hole 37 in conditioning ring 36, which is provided at the bottom with a horizontal guide piece 50, which may be of methyl methacrylate plastic or like relatively soft material, so as to minimize scratching of the surface of the cone in process. Guide piece 50 is provided with a shallow V-shaped notch 51 accepting the lower end of the optical cone therein snugly but without restraint as regards free rotation of the cone about its central axis.

As shown by way of example in Fig. 4, the rotation of plate 26 is counterclockwise, under which condition it is necessary that swing arm 44 be oriented generally as shown in this drawing in order that cone 13 be retained within notch 51 by the frictional forces applied to the cone by the rotational sweep of pitch layer 27. However, it will be understood that the direction of rotation of plate 26 can just as well be reversed, provided that the orientation of swing arm 44 and its appurtenances be likewise reversed, to the end that the cone is always positively urged toward the notch 51, which fact is indicated by the schematic arrow drawn in below cone 13 in Fig. 5.

Swing arm 44 is provided with a reciprocatory linkage 52 rotatably attached at one end to arm 44 by pin 53 and at the other end to revolving disk 56 by bolt 54. The head of bolt 54 is engaged within a T-slot 55 disposed diametrically of disk 56, thereby providing a conventional adjustable eccentric. Disk 56 is preferably rotated by connection with a motor not shown at such a speed as to reciprocate linkage 52 at about 15 cycles per minute with the eccentric adjusted to give about 1" oscillating motion measured at the outboard end of swing arm 44. It is important that the relative dispositions of swing arm 44, reciprocatory linkage 52 and center A be such that the cone 13 never ceases or reverses its rolling motion in the course of oscillation of arm 44, otherwise a flat will tend to develop on the cone surface by excessive localized lapping in the region contacting pitch layer 27 during the time interval cone 13 is at a halt. While not limiting in any sense, with the specific apparatus as hereinbefore set forth I have found that, at mid-stroke position of arm 44 as shown in Fig. 4, suitable angular dispositions are 60° counterclockwise between the center lines of 44 and 52 and 15° measured clockwise between the perpendicular bisector to the pitch-contacting generatrix of cone 13 in the plane of pitch layer 27 and a line connecting the origin of this bisector with center A.

Before commencing the lapping of the cones with the line contact apparatus of Figs. 3–5, it is essential that the lap be conditioned with the integral lap conditioning ring 36 which it is desired to employ throughout the process. At the outset, ring 36 must, itself, have its lower face flat to at least 5 microinches in 2 inches, which is accomplished by conventional techniques using a separate cast iron lapping plate. The purpose of lap conditioning ring 36 is to maintain flatness of pitch layer 27 during the lapping of the cone; however, before ring 36 is effective in this sense it must itself be "worked in" by a preconditioning process. This involves coating the surface of pitch layer 27 generously with a rouge water suspension and setting plate 26 in rotation with conditioning ring 36 in place, with grooves 33 disposed towards the pitch layer but without any cone mounted on the end of swing arm 44. Under these circumstances conditioning ring 36 will rotate about its own geometric center through frictional contact with optical pitch 27 in the course of rotation of supporting plate 26, ball bearings 38 retaining ring 36 in precise radial position with respect to center A without, however, restricting free rotational movement of the ring. The under-surface of ring 36 will accordingly be lapped by the rouge loading on pitch layer 27 and the grated surface of the ring will approach optical flatness within a period of about 2 to 3 hours in a typical example. The flat condition of the lower surface of ring 36 can be checked with an optical flat in accordance with conventional procedure, it being understood that a slight convexity in ring 36 is accompanied by a corresponding concavity in pitch layer 27, whereas a concavity in the ring is matched with a corresponding convexity in the pitch. To cure a concave surface in the pitch layer of the lap, the distance between the center of ring 36 and the center A of plate 26 is increased, whereas this distance is decreased for the reverse situation where the pitch is convex.

In this manner, by more or less trial-and-error techniques, a position will be found for conditioning ring 36 at which the surface of pitch layer 27 remains substantially flat, which is the desirable condition prior to initiating lapping of the cone. A spacing measuring 4.25" from center A to the ccenter of hole 37 for the apparatus of Figs. 3–5 has proved entirely satisfactory. An additional consideration is that the diameter of pitch undercut 40 of Fig. 4 appears to be quite critical, the free space thereof apparently permitting radial flow of the pitch inwardly, while the same freedom is provided around the outside perimeter of plate 26. In the course of extended lapping of cones it may be necessary to adjust the relative center-to-center distance between ring 36 and plate 26, and this is conveniently accomplished by simply moving plywood sheet 34 together with its integral ring 36 supported on ball bearings 38 to a new setting on frame member 30, after which 34 is firmly screwed into place so that there will be no subsequent unintended shifting.

Once pitch layer 27 is flat, by which is meant that the underside of lap conditioning ring 36 is itself brought to within about 2 microinches of optical flatness in 2" of length along a radial line, the apparatus is in condition for insertion of the cone 13 to be lapped. To facilitate this operation, the cone is provided with a rear guide (Fig. 5) consisting of a shallow aluminum cap 60, which is temporarily cemented to the base of the cone, to which is fixedly attached a ⅛" diameter guide pin 61 mounted centrally of cap 60 and provided with an enlarged cylindrical barrel 65 adjacent the cap. As shown in Fig. 5, pin 61 is of sufficient length to extend into slot 48 of extension 47, while providing through barrel 65 a seat for snugly mounting thereon a series of annular brass weights 62, 63 and 64, which may range from about 4 ounces for the heaviest to about 2 ounces for the lightest. The purpose of weights 62–64 is hereinafter explained in detail.

It will be understood that the rolling motion of the cone 13 in process is complex as regards the continuously varying rotational velocity, due to the combined effect of the sinusoidal velocity imparted to the end of link 52 by disk 56 with the continually varied angular disposition of elements of the cone in process with respect to center A. I have found that good lapping is obtained when link 52 is reciprocated twelve to fifteen complete cycles/minute while circular plate 26 is rotated at a speed of 80–100 r.p.m. Actually, the speed of rotation of plate 26 can be varied over the broad range of about 60–120 r.p.m., whereupon the cone will be rotated at 30–120 r.p.m., depending on the orientation of the cone axis with respect to center A. The most suitable choice of speed under a given set of conditions must depend on personal judgment and experience, too high a speed of rotation of the work resulting in excessive vibration and jumping with accompanying surface damage to both the pitch lap and the work while too low a speed reduces the lapping action to prohibitive levels.

In operation, the cone 13 is first lapped with the full-contact lap of Fig. 2 hereinbefore described and then with the line-contact lap of Figs. 3–5. At the commencement of lapping, when cone 13 is first received from the final grinding step, it is necessary to lap the cone with the full-contact lap for a relatively protracted period of from about 3 to about 5 hours. This is usually effective in the removal of grinding marks which occur over about 90% of the cone surface, namely, that portion between the extreme ends of the cone exclusive of narrow bands approximately ¹⁄₁₆" to ⅛" wide at each end. The areas within these narrow bands might remain substantially unlapped during this stage, due to the fact that grinding at the extreme boundaries of objects tends to remove a somewhat greater amount of material, typically 10 to 20 microinches more, than from the intermediate regions. However, the end regions are improved by subsequent lapping, and, at the end of the third or fourth cycle of repeated full-contact alternated with line-contact lapping, which in total removes 25 to 30 microinches of additional material, the complete surface of the cone is, for all practical purposes, brought to the same high quality finish throughout. The surface is, at this point, so clear as to permit visual observation of images reflected therefrom. Lapping is thereafter continued in successive steps repetitively and in alternation first with one lap and then with the other, taking care that extended lapping with either apparatus is avoided, because lengthy full-contact lapping will impart circular scratches to the surface concentric with the axis of the cone while excessive lapping by the line-contact process results in scratches oriented toward the apex of the cone. In order to obtain the high surface quality which is desired, it is, therefore, necessary to restrict the time of lapping in each phase to relatively short intervals, starting with durations of about ½ hour for each during the initial rough lapping and decreasing progressively to about 5 minutes or less for each as perfection is approached.

It is essential that the cone surface be appraised with an optical flat along generating elements to safeguard against imparting a slight contour to the cone. A solid black fringe appearing in an optical flat in contact with the cone taper from apex to base indicates linear trueness of the conical surface. In the event that the cone contour is found to be slightly convex, i.e., pitch layer 27 is slightly concave, the distance from center A to the center of ring 36 is increased slightly by altering the position of plywood 34. On the other hand, if the cone contour is slightly concave, it is necessary to alter the surface of pitch layer 27 to make it somewhat more concave, in which case the distance from center A to the center of ring 36 is reduced. Due to slight resilience of pitch layer 27, I have found that the most perfect cone contours are obtained when conditioning ring 36 is concave to the extent of about 2 microinches over a 2" radial length as observed by an optical flat.

In appraising the separate steps hereinabove described for their individual contributions to the final product, the full-contact lap of Fig. 2 produces true roundness in any plane normal to the cone axis, whereas cone contour is controlled by the flatness of the line-contact lap of Figs. 3–5. At the same time, each of the lapping steps appears complementary to the other in eliminating scratches characteristic of the individual processes, to the end that a very high optical surface quality is obtained.

An additional effect of the line-contact lapping process is the very important one of control of the included angle of the cone. The cone included angle is determined by the masses of weights 62–64, Fig. 5, and any additional similar weights not shown, which exert predetermined forces on cone 13 through preselected moment arms. I have found experimentally that, with a near 90° included angle cone fabricated from quartz and lapped in line-contacting with the system hereinbefore specifically described, weights 62, 63 and 64 of the values hereinafter tabulated result in an equilibrium condition during line-contact lapping in which lapping can be conducted for an indefinite time with retention of a substantially constant included angle.

The control achieved by loading weights according to this invention is a sensitive one which is effective only when cone 13 is near 90° included angle and presupposes that all other factors in the line-contact lapping remain substantially unchanged, including the speed of rotation of circular plate 26, the material-removing properties of the abrasive rouge, the flatness of both pitch layer 27 and conditioning ring 36, and other responsible parameters. The three weights 62, 63 and 64 were all ⅛" thick brass, annular in form and drilled centrally with a ⅜" diameter bore. The actual weights of the several system components, together with their individual or combination moment arms measured from arbitrarily selected vertical reference line M—M' of Fig. 5, intersecting the extended longitudinal axis of cone 13, were as follows for the particular cone herein described:

| Component Identified by Reference Character, Fig. 5 | Material of Construction of Component | Wt. in Lbs. of Component or Sub-Assembly of Components | Distance from Reference Line M—M' to Center of Gravity of Component or Sub-Assembly of Components |
| --- | --- | --- | --- |
| Cone 13 | Quartz | 0.425 | 0.367" to right. |
| Cup 60 together with barrel 65 | Aluminum | 0.040 | |
| Guide pin 61 | Brass | 0.005 | |
| Combined assembly of cone 13, cup 60, barrel 65 and guide pin 61. | | 0.470 | 0.320" to right. |
| Weight 62 | Brass | 0.234 | 0.089" to left. |
| Weight 63 | Brass | 0.192 | 0.177" to left. |
| Weight 64 | Brass | 0.155 | 0.265" to left. |
| (1) Combined assembly of cone 13, cup 60, barrel 65, pin 61 and wts. 62 and 63. | | 0.896 | 0.106" to right. |
| (2) Assembly (1), supra, plus wt. 64 | | 1.051 | 0.051" to right. |
| (3) Assembly (2), supra, plus 0.122 lbs. | | 1.173 | 0.009" to right. |

From the foregoing, it is clear that successive addition of the weights 62–64, plus the final 0.122 lb. weight, causes a progressive shift to the left, as seen in Fig. 5, in the location of the center of gravity of the several sub-assemblies of components. This results in the application of progressively greater force reactions between the cone and pitch layer 27 at the base end of cone 13 as compared with the apex end.

I have found that the equilibrium condition (i.e., zero effect on the included angle) during line-contact lapping existed with weights 62, 63 and 64 solely in place as shown in Fig. 5 on the cone 13 provided with the specific cup 60, barrel 65 and pin 61 having the weights and moment arms tabulated. At this point another brass annular 1/8" thick weight of 0.122 lb. and 3/8" bore was added by slipping it over pin 61 and barrel 65 to a position of rest on weight 64. This shifted the center of gravity of the entire system to a point 0.009" to the right of reference line M—M', as compared to the location of the center of gravity of the immediately preceding sub-assembly, which was 0.051" to the right of M—M'. In effect, the base end of cone 13 is thereupon brought to bear more heavily on pitch layer 27, and it was found that the cone included angle thereafter decreased at the rate of 3 seconds per hr. as line-contact lapping was continued. The reverse action is equally feasible and, in fact, removal of the newly added 0.122 lb. weight together with weight 64, which latter had a value of 0.155 lb. as hereinabove tabulated, increased the included angle of cone 13 in process at a rate of precisely 3 seconds per hour of line-contact lapping. With these relationships known for the particular system herein described, it is possible to settle on the correct moment arms and loading weights which are necessary for other sizes, materials of construction, or additionally varied cones.

By a judicious choice of weights and careful attention to the time durations of the two lapping steps, as well as the replenishment of rouge-in-water suspension as conditions require, it is possible to obtain a near-perfect cone, within one's ability to measure perfection, in a total lapping time of about 10–15 hours, in a typical instance. In this connection it will be understood that the time required for abrasive application, lap conditioning, cleaning of the cones prior to check measuring, performing the check measurements themselves, and other incidental operations is in addition to that required for the lapping per se. Accordingly, the total elapsed time for combined full-contact and line-contact lapping is about 40 hours.

Three types of measurements are necessary to confirm cone quality in terms of: (1) the included angle, (2) the contour and (3) the roundness. The included angle is measured with a fixture hereinafter described in conjunction with a conventional auto-collimator, such as the double image type manufactured by the Davidson Manufacturing Co., West Covina, California. This device projects two internal images in the form of collimated light and it is thereby possible to measure the angle between external reflecting surfaces as a function of the separation of the two reflected images with respect to one another. If the double image auto-collimator is initially properly adjusted, reflection of each image from a perfectly plane reflector is accompanied by superposition of the images upon visual inspection by an observer. Slight angular deviations from a plane of two reflectors cause relative displacement of the pair of reflected images and the corresponding angular deviation is in direct measurable relationship to the displacement perceived by the observer.

Measurements with the double image auto-collimator are facilitated by the use of a fixture such as that detailed in Figs. 6–8. This fixture is of one-piece construction and comprises two blocks of highly polished metal 69 and 70, such as tool steel or the like, connected along the adjacent inside edges with a metal flexure piece 71, which permits blocks 69 and 70 to turn slightly about the vertical longitudinal axis of the strip 71 and thereby vary the included angle measured between the inside surfaces 69a and 70a. Referring to Fig. 7 it will be seen that the two inside surfaces 69a of block 69 and also the two inside surfaces 70a of block 70 are separated one from another by undercuts 73 and 74, respectively. The reason for this is that surfaces 69a and 70a are the sensing surfaces which contact the object under measurement, and it is desired that the overall included angle of the object be measured, rather than any local angle which might exist in the intermediate region between cone and base due to any slight convexity occurring in a cone element in manufacture before perfection is attained. Wide separation of the surfaces 69a and 70a enable accurate, reproducible included angle measurements by precluding rocking of the fixture as a result of contact with slight local anomalies in the intermediate expanse of the cone. Surfaces 69a and 70a are finished optically flat in themselves and the surfaces on each side of the V defined by the fixture are flat within 2 microinches in their lengths and widths as well as being coplanar within 2 microinches. The light-reflective front surfaces 76 and 77 of blocks 69 and 70, respectively, disposed towards the collimator barrel, indicated generally at 75, are optically flat and highly polished. The projected area of the aperture of an auto-collimator barrel 75 in viewing position is indicated in broken outline at 80, Fig. 8. To isolate the areas reserved for each of the collimated images, the upper half of front surface 77 and the lower half of front surface 76 are masked at 78 and 79, respectively, with opaque masking tape.

As shown in Figs. 6, 7 and 8, the angular checking fixture is preferably utilized for measurement of the included angle of an optical cone by mounting on a special frame, which may be an L-shaped metal base 83. The cone 13 to be evaluated is cradled on a pair of oppositely disposed pins 84 located in base 83 120° around from 12 o'clock position as viewed by auto-collimator 75 in Fig. 6. The weight of cone 13 rests on pins 84 and the cone is retained securely in position by a spring clip 85 attached to the base at 12 o'clock position which extends slightly over the base edge of the conical portion of 13 and, by its compression inwardly, biases the base of the cone against the flat surface 86 of the upstanding edge of base 83. Surface 86 is, of course, finished to an optical flat and is disposed normal to the bottom leg of base 83, so that cone 13 is oriented in space with the same precision as hereinbefore described with respect to the grinding fixture of Fig. 1, with axis substantially horizontal and parallel to the axis of 75.

The angular checking fixture consisting of block 69, block 70 and flexure piece 71 is preferably supported on bearing balls 87 which rest on the upwardly disposed face of base 83, which is lapped flat within 20 microinches in 2½". The angular checking fixture is biased snugly towards cone 13 with a force of about one ounce by the two oppositely disposed helical springs 88 which engage at the ends with pins 89 on the fixture and 90 on base 83, the line of force application of the springs being parallel to the longitudinal axis of the cone. In addition, a narrow centrally disposed spring clip 91 is provided at the front edge of base 83, to which it is secured by screw 92, the upper end of this clip bearing against the outside face of flexure piece 71 to urge the fixture along a line coincident with the cone axis in a region outside the fields of view 76 and 77.

Measurement of the included angle of a specific optical cone 13 necessitates advance calibration of the equipment employed as follows. First, the auto-collimator 75 must be checked by viewing an optically flat reflector and then bringing the two optical images into coincidence by means of the adjusting wheel of the instrument. Conventionally, this adjusting wheel is milled with a peripheral scale of one hundred divisions, each division representing one second of arc. The auto-collimator is constructed for convenience in use so that mid-scale reading in the neighborhood of fifty divisions corresponds to coincidence of the two images when there is reflection from a perfectly plane surface such as the optical flat. The exact scale reading for this condition should, however, be actually checked by the observer and the corresponding adjusting wheel scale reading noted, as this is the precise auto-collimator 180° reading.

The next step in the calibration is that of the angular checking fixture of Figs. 6–8. For this it is necessary to employ a standard 90° angle block, such as the conventional "Webber" angle block known to the art. Surfaces 69a and 70b are brought into contact with the opposite faces of the known 90° angle block in similar manner to that hereinbefore described when an optical cone is being evaluated, and surfaces 76 and 77 of the fixture viewed through the auto-collimator. The two optical images of the collimator are again brought into coincidence for the new condition with the fixture in view by appropriately turning the adjusting wheel. The corresponding scale reading is a precise measure in seconds of arc of the amount by which the angle existing between surfaces 76 and 77 differs from 180° when the scale reading is compared with the auto-collimator 180° reading. If the reading when viewing surfaces 76 and 77 is less than the auto-collimator 180° reading, then the angle between surfaces 76 and 77 is less than 180° by the difference in seconds of arc between the auto-collimator 180° reading and the new reading. Conversely, a greater reading indicates an angle between surfaces 76 and 77 in excess of 180°. The reading with the fixture in view is recorded and constitutes the fixture established 90° base point.

Now, when the angular checking fixture V is brought with its surfaces 69a and 70a into contact with the exterior surfaces of an object having an included angle near 90°, as shown in Figs. 6–8, and surfaces 76 and 77 are viewed with auto-collimator 75, a measurement can be effected when the two optical images are again brought into coincidence by appropriately turning the instrument adjustment wheel. The resulting scale reading, corrected for the inherent deviation within the fixture as represented by its established 90° base point, is an exact measure, to a precision of one second of arc, of the included angle of the object under evaluation.

A second method, dispensing with standard 90° blocks, which can be employed for the calibration of the angular checking fixture entails the use of two auto-collimators, one being a double image type and the other a conventional single image auto-collimator design such as that manufactured by Hilger & Watts, Ltd., London, England. With this procedure the single image instrument is oriented to view the inside polished surfaces 69a and 70a disposed at the V defined by blocks 69 and 70. With this arrangement the plane surfaces defining the included angle together reflect like a flat mirror when the included angle equals precisely 90°. The included angle between blocks 69 and 70 is progressively adjusted by tapping one block or the other in the necessary direction to either increase or decrease the angle toward the 90° standard setting desired, weights being placed on top of the fixture so that the frictional forces retain the fixture, and thus the included angle, at the preset position. When the included angle attains precisely 90°, only one image is seen in the single image auto-collimator. At this point, with the fixture position unaltered, a double image auto-collimator calibrated against an optical flat is employed to view surfaces 76 and 77. The established 90° base point reading for the fixture is thereafter obtained in exactly the same manner as hereinbefore described. The general technique of establishing a precise 90° angle separation of the pair of reflective surfaces 76 and 77 presented by blocks 69 and 70 is described in full detail in "Amateur Telescope Making," Book 3, pp. 253–257, published by "Scientific American" (1956).

The measurement of cone contour is made with an optical flat and a monochromatic light source (e.g., a mercury-vapor or sodium-vapor lamp). In this evaluation the optical flat is placed in contact with the sloping surface of the cone at one or two random positions and the monochromatic light directed through the flat against the cone. Under these circumstances a multiplicity of straight-line light interference fringes are visually apparent radiating from the apex of the cone as a common point toward the cylindrical base of the cone. Normally, one can detect about 5 fringes disposed symmetrically on each side of the central fringe, which is the widest. These light interference fringes are relatively fine and visual observation is aided by the use of an eye-loupe having a magnification of 7X to 14X. A perfect conical surface produces straight-line light interference fringes converging to the apex of the cone. Persons skilled in the optical arts have no difficulty in interpreting the fringe patterns which are obtained when the cone contours are imperfect.

Finally, cone roundness is evaluated, but this test is more deductive in appraisal of the results than the tests for included angle and cone contour hereinbefore described. Cone roundness can best be ascertained by inserting the cone as the reflective element of a bore interferometer, described in detail in my copending application Ser. No. 845,494, hereinbefore mentioned, utilizing a standard, perfectly cylindrical test bore in conjunction therewith to obtain a concentric circular light interference fringe pattern five to seven in number per radial inch, and observing the concentricity obtained. Any non-circularity in the cone is accompanied by a counterpart deviation in the fringe configuration and pattern. Any out-of-roundness in the cone ascertained by this test can be cured by additional full-contact and line-contact lapping with rouge-in-water abrasive as hereinbefore described. Fortunately, the lapping processes constituting this invention inherently produce cones round in planes normal to the longitudinal axis and this potentially most serious departure from perfection is actually the least serious problem encountered.

It will be understood that for light interferometric use the optical cones should be either less or greater than precisely 90° by about 16 or 18 seconds of arc as regards the included angle, while having as near perfect contour and roundness as it is possible to achieve. In this connection, it will be understood by persons skilled in the art that cones which are precisely 90° included angle are not adapted to use in interferometry of the type detailed in my copending application Ser. No. 845,494, because only a single light fringe covering the entire length of the cone will be perceived by the observer, whereas a multiplicity of five to seven fringes per radial inch of cone is required. Nevertheless, the process and apparatus of this invention can be utilized to obtain perfect 90° included angles or, for that matter, any other preselected included angle of cone if this is required for any particular use envisaged. To improve the reflective qualities of the cones following their development to standards hereinbefore set out, I prefer to give them a metallic coating. Accordingly, I deposit thereon about 5 to 10 microinches of a reflective metal, such as aluminum or the like, by conventional vapor deposition techniques known to the art. If desired, the deposited metal can be protected against damage from accidental contacts by coating with one of a number of lens-coating agents which are in common use in the photographic art.

The foregoing description has been directed to the manufacture of a quartz cone; however, it will be understood that similar cones can be made from metal, in which case the laps can be fabricated from metal, polymeric substances or other materials which have demonstrated value in this service. Typical metals, or alloys, which are suitable for the fabrication of optical cones include, as examples, tool steels, some types of stainless steel, copper, silver, chromium and stellite. Optical cones should, in any case, be fabricated from materials desirably having one or more of the following characteristics: (1) high surface reflectivity when polished, or capable of being coated with a light-reflective substance, (2) high dimensional stability, (3) low thermal coefficient of expansion, (4) lacking in voids, (5) high purity of chemical composition, and (6) homogeneity, i.e., uniformity in structure and lacking in inclusions.

It will be understood that this invention is not limited to the manufacture of optical cones per se but, in fact, is directed to the manufacture of high precision cones generally, without regard to the ultimate use to which such cones can be put; however, the manufacture of optical cones is a particularly important objective and, accordingly, has been hereinbefore described as my detailed example.

It will be further understood that various materials can be substituted for the optical pitch, depending upon the material of fabrication of the cone in process. It will be apparent to those skilled in the art that the lapping motions hereinbefore described can be modified in many respects without departure from the essential spirit of my invention. It will also be understood that a wide variety of abrasive materials can be substituted for the red rouge described, including cerium oxide and others which are known to the art. Diamond powder in an oil vehicle, used in conjunction with a cast iron lap, is especially effective in the lapping of metals. Also, while I have found it convenient to retain my cone 13 on the inside of the circular aperture within conditioning ring 36 during lapping, this is not essential and the cone can, in fact, be located outside the ring in contact with the pitch exposed elsewhere. Finally, the lapping pattern of the line-contact lapping process hereinbefore described can be varied over an extremely wide range while still preserving the random pattern necessary to the production of cones of precise geometry.

From the foregoing it will be understood that this invention can be modified extensively within its essential spirit and it is intended to be limited only by the scope of the appended claims.

What is claimed is:

1. A process for the manufacture of a precision cone having a preselected included angle comprising in sequence and in alternation finishing a cone of approximately the desired included angle by full-contact lapping and line-contact lapping until said cone is brought to a value of included angle substantially equal to said preselected included angle and until the surface of said cone is brought to a quality of about 0.25 microinch R.M.S. or better.

2. A process for the manufacture of a precision circular cone having a preselected included angle differing from precisely 90° by about 16 to 18 seconds of arc comprising in sequence and in alternation finishing said cone having approximately the preselected included angle by full-contact lapping and line-contact lapping using a rouge suspension-in-water in conjunction with an optical pitch lap until said cone is brought to an included angle substantially equal to said preselected included angle and until the surface of said cone is brought to a quality of about 0.25 microinch R.M.S. or better.

3. A process for the manufacture of a precision circular cone having a preselected included angle differing from precisely 90° by about 16 to 18 seconds of arc according to claim 2 wherein said line-contact lapping consists of rotating said cone in one direction solely by frictional contact along a line corresponding generally to an element of said cone with a layer of optical pitch having its surface maintained substantially planar and wet with a rouge-in-water suspension, and simultaneously oscillating said cone to-and-fro with respect to said optical pitch layer along a line substantially parallel to the plane of said layer of optical pitch.

4. A process for the manufacture of a precision circular cone having a preselected included angle differing from precisely 90° by about 16 to 18 seconds of arc comprising in sequence grinding said cone to approximately 90° included angle, lapping said cone in full-contact lapping using a rouge suspension-in-water in conjunction with an optical pitch lap until all grinding marks are removed from substantially 90% of the surface of said cone and thereafter finishing said cone repetitively and alternately by subjecting said cone to said full-contact lapping and to a line-contact lapping, said latter lapping employing a rouge suspension-in-water in conjunction with an optical pitch lap, in successive steps ranging from about 30 minutes duration each for said full-contact lapping and said line-contact lapping to about 5 minutes each, until said cone is brought to a value of included angle substantially equal to said preselected included angle and until the surface of said cone is brought to a quality of about 0.25 microinch R.M.S. or better.

5. A process for the manufacture of a circular optical cone having a preselected included angle differing from precisely 90° by about 16 to 18 seconds of arc comprising in sequence grinding said optical cone to approximately 90° included angle, lapping said optical cone in full-contact lapping using a rouge suspension-in-water in conjunction with an optical pitch lap until all grinding marks are removed from substantially 90% of the surface of said optical cone and thereafter finishing said optical cone repetitively and alternately by subjecting said optical cone to said full-contact lapping and to a line-contact lapping, said line-contact lapping consisting of rotating said optical cone in one direction solely by frictional contact along a line corresponding generally to an element of said optical cone with a layer of optical pitch having its surface maintained substantially planar and wet with a rouge-in-water suspension while simultaneously oscillating said optical cone to-and-fro with respect to said optical pitch layer along a line substantially parallel to the plane of said layer of optical pitch, in successive steps ranging from about 30 minutes duration each for said full-contact lapping and said line-contacting lapping to about 5 minutes each, until said optical cone is brought to a value of included angle substantially equal to said preselected included angle and until the surface of said optical cone is brought to a quality of about 0.25 microinch R.M.S. or better.

6. A process for the manufacture of a circular optical cone having a preselected included angle differing from precisely 90° by about 16 to 18 seconds of arc according to claim 5 wherein preselected force moments are applied to said optical cone during said line-contact lapping on a preselected side of a reference line drawn vertical to said layer of optical pitch in a plane including the axis of said optical cone to correspondingly vary the lapping action occurring along a given element of said optical cone with accompanying alteration of the included angle of said optical cone during the progress of said line-contact lapping.

7. An apparatus for the line-contact lapping of precision cones comprising, in combination, a rotating plate disposed with axis of rotation substantially vertical and covered with a layer of optical pitch over the entire top surface except for a central circular area approximately 4" in diameter kept free of pitch, a rotatable rigid lap conditioning ring supported by abutment on said optical pitch in a predetermined position in space at a preselected eccentricity with respect to the center of rotation of said rotating plate, said lap conditioning ring being adapted to be rotated by frictional contact with said layer of optical pitch, a support arm pivoted for free rotation at one end and having the other end overlying said layer of optical pitch, means at said other end of said support arm for the retention of a cone being lapped in free rotation under frictional contact along an element of said cone with said layer of optical pitch, and means connected to said support arm for to-and-fro oscillation of said support arm and said cone in retention therewith across the surface of said layer of optical pitch.

8. An apparatus for the line-contact lapping of precision cones according to claim 7 wherein said lap conditioning ring is an annulus of glass about 2" thick provided on the face in abutment with the surface of said layer of optical pitch with two series of straight grooves about ⅛" deep and ⅛" wide, one series being disposed substantially normal to the other, which grooves of either said series are spaced apart a pitch of about 1".

9. An apparatus for the line-contact lapping of precision cones according to claim 7 wherein said means for the retention of said cone being lapped in free rotation under frictional contact along an element of said cone with said layer of optical pitch comprises a cap fixedly attached to the base of said cone provided with a pin loosely engaging at the end with a retaining slot in said end of said support arm overlying said layer of optical pitch, said pin being sufficiently long to accommodate the reception of one or more annular weights to thereby regulate within preselected limits the force applied to one side or the other of a vertical reference line drawn in a plane including the axis of said cone and correspondingly vary the lapping action occurring along a given element of said cone with accompanying alteration of the included angle of said cone, and means integral with said support arm provided with a V-shaped notch for the loose reception therein of the apex of said cone.

References Cited in the file of this patent

UNITED STATES PATENTS

| | | |
|---|---|---|
| 2,024,268 | Bausch et al. | Dec. 17, 1935 |
| 2,386,687 | Jearum | Oct. 9, 1945 |
| 2,398,628 | Dykoski et al. | Apr. 16, 1946 |
| 2,404,282 | Fruth | July 16, 1946 |